(12) United States Patent
Hamada et al.

(10) Patent No.: US 10,507,703 B2
(45) Date of Patent: Dec. 17, 2019

(54) STRUT MOUNT AND SUSPENSION MECHANISM USING THE SAME

(71) Applicant: SUMITOMO RIKO COMPANY LIMITED, Komaki-shi, Aichi (JP)

(72) Inventors: Masaaki Hamada, Komaki (JP); Shingo Kondo, Komaki (JP); Hideto Nishinaka, Komaki (JP); Hironori Koyama, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 50 days.

(21) Appl. No.: 15/685,551

(22) Filed: Aug. 24, 2017

(65) Prior Publication Data

US 2017/0368899 A1    Dec. 28, 2017

Related U.S. Application Data

(63) Continuation of application No. PCT/JP2016/075786, filed on Sep. 2, 2016.

(30) Foreign Application Priority Data

Jun. 27, 2016   (JP) .................................. 2016-126994

(51) Int. Cl.
   *B60G 15/06*   (2006.01)
   *B60G 17/005*   (2006.01)
   (Continued)

(52) U.S. Cl.
   CPC ............ *B60G 15/068* (2013.01); *B06B 1/164* (2013.01); *B60G 13/003* (2013.01);
   (Continued)

(58) Field of Classification Search
   CPC .......... F16F 9/54; F16F 13/10; B60G 15/068; B60G 13/003; B60G 13/10; B60G 17/005;
   (Continued)

(56) References Cited

U.S. PATENT DOCUMENTS 5,232,209 A * 8/1993 de Fontenay ............ B60G 7/02
                                                           267/140.13
6,349,785 B1 * 2/2002 Ohmika ................. B62K 11/10
                                                           180/219

(Continued)

FOREIGN PATENT DOCUMENTS

JP    H05-010370 A    1/1993
JP    H08-152044 A    6/1996
(Continued)

OTHER PUBLICATIONS

Nov. 1, 2016 Search Report issued in International Application No. PCT/JP2016/075786.

(Continued)

*Primary Examiner* — Melody M Burch
(74) *Attorney, Agent, or Firm* — Oliff PLC

(57) ABSTRACT

A strut mount including: a first mounting member configured to be attached to a shock absorber; a second mounting member configured to be attached to a vehicle body; a main rubber elastic body elastically connecting the first and second mounting members to each other; a fluid-filled zone whose interior is filled with a non-compressible fluid such that a vibration damping effect is obtained based on a flow action of the fluid; and an orifice passage through which the fluid filled in the fluid-filled zone is induced to flow. A tuning frequency of the orifice passage is set to a frequency of a (Continued)

vibration transmitted during lockup of an automobile from a drive train of the automobile to the vehicle body via the shock absorber.

6 Claims, 10 Drawing Sheets

(51) Int. Cl.
*B60G 13/00* (2006.01)
*B06B 1/16* (2006.01)
*F16F 9/54* (2006.01)

(52) U.S. Cl.
CPC .............. *B60G 17/005* (2013.01); *F16F 9/54* (2013.01); *B60G 2202/312* (2013.01); *B60G 2204/128* (2013.01); *B60G 2204/41* (2013.01); *B60G 2204/418* (2013.01)

(58) Field of Classification Search
CPC ........ B60G 2202/312; B60G 2204/128; B60G 2204/41; B60G 2204/418
See application file for complete search history.

(56) References Cited

U.S. PATENT DOCUMENTS

| 6,655,669 | B1* | 12/2003 | Jung | B60G 13/001 |
| | | | | 267/219 |
| 6,764,066 | B2* | 7/2004 | Graeve | B60G 13/003 |
| | | | | 188/321.11 |
| 2012/0306134 | A1* | 12/2012 | Tanaka | F16F 13/18 |
| | | | | 267/140.13 |
| 2014/0145383 | A1* | 5/2014 | Yasuda | F16F 13/268 |
| | | | | 267/140.13 |

FOREIGN PATENT DOCUMENTS

| JP | 2618787 B2 | 6/1997 |
| JP | 2001-074086 A | 3/2001 |
| JP | 2002-228676 A | 8/2002 |
| JP | 2004-231091 A | 8/2004 |
| JP | 2009-127656 A | 6/2009 |
| JP | 2010-078109 A | 4/2010 |
| JP | 2014-145410 A | 8/2014 |
| JP | 2016-075347 A | 5/2016 |

OTHER PUBLICATIONS

Jan. 10, 2019 International Preliminary Report on Patentability (Chapter I) issued in International Application No. PCT/JP2016/075786.

* cited by examiner

STRUT MOUNT AND SUSPENSION MECHANISM USING THE SAME

INCORPORATED BY REFERENCE

The disclosure of Japanese Patent Application No. 2016-126994 filed on Jun. 27, 2016 including the specification, drawings and abstract is incorporated herein by reference in its entirety. This is a Continuation of International Application No. PCT/JP2016/075786 filed on Sep. 2, 2016.

BACKGROUND OF THE INVENTION

1. Field of the Invention

The present invention relates generally to a strut mount configured to be mounted between a shock absorber and a vehicle body in an automotive suspension and to a suspension mechanism using the same. More particularly, the present invention pertains to a fluid-filled strut mount utilizing vibration damping effect based on the flow action of the fluid filling the interior and to a suspension mechanism using the same.

2. Description of the Related Art

Conventionally, vibration damping devices of various kinds have been used with the aim of realizing good ride comfort or the like for automobiles. By being disposed between the vibration source that constitutes the vibration transmission system and the component to be damped, the vibration damping devices are configured to prevent the vibration input from the vibration source from deteriorating the vibration state of the component to be damped. Such vibration damping devices include the one obtaining vibration damping effect through energy loss during elastic deformation of a rubber elastic body, the one obtaining vibration damping effect based on the flow action of the fluid, and the like.

One of the vibration sources which can be a problem in the automobiles is a power unit such as an internal combustion engine and motors. Accordingly, a countermeasure adopted in general is, for example, to dispose an engine mount serving as the vibration damping device such as disclosed in Japanese Unexamined Patent Publication No. JP-A-2010-078109 between the power unit which is the vibration source and the vehicle body which is the component to be damped, so as to prevent the vibration input from the power unit from being transmitted to the vehicle body. Besides, another one of the vibration sources which can be a problem in the automobiles is what is caused by the vibration of the wheel assembly due to depressions or ridges of the road surface, or the like. Accordingly, a countermeasure adopted in general is, for example, to dispose a suspension bushing serving as the vibration damping device such as disclosed in Japanese Unexamined Patent Publication No. JP-A-2014-145410 between the wheel assembly which is the vibration source and the vehicle body which is the component to be damped, so as to prevent the vibration input from the road surface from being transmitted to the vehicle body.

Meanwhile, for the automobiles in recent times, due to an increase in concerns about economical efficiency, reduction of the load on the environment or the like, enhanced fuel economy performance is highly required to the extent comparable to or greater than that for ride comfort or traveling performance. In order to meet the high requirement for such enhanced fuel economy performance, examined are measures such as downsizing of the engine by decreasing the number of cylinders, or performing lockup at a lower engine speed.

However, it has been revealed that when making an attempt to enhance fuel economy through decrease in the number of cylinders of the engine or reduction in the lockup engine speed, namely the engine speed at which lockup is performed, the vibration state of the vehicle body becomes deteriorated during lockup.

SUMMARY OF THE INVENTION

The present invention has been developed in view of the above-described matters as the background, and it is an object of the present invention to provide a strut mount with a novel structure which is able to realize an excellent vibration damping performance, and to provide a suspension mechanism using the same.

The above and/or optional objects of this invention may be attained according to at least one of the following modes of the invention. The following modes and/or elements employed in each mode of the invention may be adopted at any possible optional combinations.

The inventors examined the cause of deterioration of the vibration state of the vehicle body due to decrease in the number of cylinders or reduction in the lockup engine speed. Then, the inventors found out that the deterioration was caused by the vibration due to torque fluctuations during lockup being transmitted from the drive train such as a drive shaft to the vehicle body via a suspension as a transmission path. They guessed that in such a new vibration transmission path, during input of low-frequency vibration, resonance is produced in the vibration transmission system such as the suspension system and the drive train, for example. Accordingly, it is guessed that when the frequency of vibration due to torque fluctuations during lockup becomes lower due to decrease in the number of cylinders or reduction in the lockup engine speed, the vibration is amplified by the resonance and transmitted to the vehicle body so that the vibration state of the vehicle body becomes deteriorated. The inventors confirmed their guess through simulations and tests.

On the basis of such findings, the inventors considered that by reducing the transmission of the vibration on the vibration transmission path through which the vibration due to torque fluctuations during lockup is transmitted from the suspension to the vehicle body, it should be possible to improve the vibration state of the vehicle body and enhance vibration damping performance as well as quiet performance of the vehicle, and they achieved the present invention.

Specifically, a first mode of the present invention provides a strut mount comprising: a first mounting member configured to be attached to a shock absorber; a second mounting member configured to be attached to a vehicle body; a main rubber elastic body elastically connecting the first and second mounting members to each other; a fluid-filled zone whose interior is filled with a non-compressible fluid such that a vibration damping effect is obtained based on a flow action of the fluid; and an orifice passage through which the fluid filled in the fluid-filled zone is induced to flow, wherein a tuning frequency of the orifice passage is set to a frequency of a vibration transmitted during lockup of an automobile from a drive train of the automobile to the vehicle body via the shock absorber.

With the strut mount of construction according to the first mode, the vibration transmitted to the vehicle body via the shock absorber of the suspension during lockup will be decreased based on the flow action such as resonance action of the fluid flowing through the orifice passage. Thus, even if the number of cylinders of the engine is decreased or the lockup engine speed is reduced such that the frequency of vibration due to torque fluctuations during lockup becomes a low frequency for which resonance or the like of the suspension system or the drive train can be a problem, it is possible to prevent the vibration state of the vehicle body from being deteriorated during lockup.

Moreover, the strut mount is of fluid-filled type, and the orifice passage of the strut mount is tuned to the frequency of vibration transmitted to the vehicle body via the shock absorber during lockup. Therefore, with a simple structure utilizing the strut mount conventionally interposed between the shock absorber and the vehicle body, enhanced vibration damping performance during lockup can be realized.

A second mode of the present invention provides the strut mount according to the first mode, wherein the tuning frequency of the orifice passage is set not greater than 50 Hz.

According to the second mode, the tuning frequency of the orifice passage is set within the frequency range for which rigid body resonance or the like of the suspension system is likely to arise. This makes it possible to obtain excellent vibration damping performance in the frequency range for which amplification of vibration tends to be a problem due to resonance or the like of the suspension system or the drive train.

A third mode of the present invention provides the strut mount according to the first or second mode, wherein the fluid-filled zone includes a primary liquid chamber whose wall part is partially defined by the main rubber elastic body and an auxiliary liquid chamber whose wall part is partially defined by a flexible film, and the primary liquid chamber and the auxiliary liquid chamber are interconnected by the orifice passage.

According to the third mode, adopted is the structure in which the primary liquid chamber, which gives rise to internal pressure fluctuations during input of vibration, and the auxiliary liquid chamber, for which internal pressure fluctuations are less likely to arise due to deformation of the flexible film that permits changes in volume of the auxiliary liquid chamber, are interconnected by the orifice passage. Thus, vibration damping effect based on the flow action of the fluid can be advantageously obtained.

A fourth mode of the present invention provides the strut mount according to the third mode, wherein the flexible film has an annular shape such that the flexible film is allowed to be arranged axis-perpendicularly between the shock absorber and a coil spring that is placed externally about the shock absorber.

According to the fourth mode, the flexible film is arranged by utilizing the space between the shock absorber and the coil spring. This makes it possible to set the volume of the auxiliary liquid chamber with a large degree of freedom, thereby effectively attaining desired vibration damping performance.

A fifth mode of the present invention provides the strut mount according to any one of the first through fourth modes, wherein the strut mount is configured such that the vibration to be transmitted during lockup of the automobile from the drive train of the automobile to the vehicle body via the shock absorber is input across the first mounting member and the second mounting member in a generally axial direction, while a road surface vibration to be transmitted from a wheel assembly that is in contact with a road surface to the vehicle body via the shock absorber is also input across the first mounting member and the second mounting member in either one of a generally axis-perpendicular direction and a prizing direction, and a resonance frequency of the fluid with respect to the vibration input in either one of the generally axis-perpendicular direction and the prizing direction is set to a higher frequency than the tuning frequency of the orifice passage.

According to the fifth mode, the vibration damping effect will be exhibited with respect to not only the vibration transmitted during lockup from the drive train to the vehicle body via the shock absorber but also the vibration input from the wheel assembly that is in contact with a road surface. Moreover, the input vibrations from the road surface include the vibrations of frequencies roughly the same as that of the vibration transmitted from the drive train during lockup, as well as the vibrations of higher frequencies. Therefore, even if the resonance frequency of the fluid with respect to the vibration input from the road surface is set to a higher frequency than the tuning frequency of the orifice passage and the fluid flow with respect to the vibration input from the road surface is substantially blocked for the orifice passage due to antiresonance, the vibration damping effect can be efficiently obtained with respect to the vibration input from the road surface in the generally axis-perpendicular direction or the prizing direction.

A sixth mode of the present invention provides the strut mount according to the fifth mode, wherein the fluid-filled zone includes a primary liquid chamber whose wall part is partially defined by the main rubber elastic body and an auxiliary liquid chamber whose wall part is partially defined by a flexible film, and the primary liquid chamber and the auxiliary liquid chamber are interconnected by the orifice passage, the primary liquid chamber includes respective extended areas on opposite sides thereof in an axis-perpendicular direction and constricted areas interconnecting the extended areas in a circumferential direction, and the constricted areas are configured to allow a fluid flow therethrough between the extended areas due to the vibration input in either one of the generally axis-perpendicular direction and the prizing direction, and the resonance frequency of the fluid flowing through the constricted areas is set to a higher frequency than the tuning frequency of the orifice passage.

According to the sixth mode, it is possible to attain vibration damping effect with respect to the vibration input in the generally axis-perpendicular direction or the prizing direction based on the resonance action or the like of the fluid flowing between the extended areas through the constricted areas. Furthermore, since the extended areas and the constricted areas are provided in the primary liquid chamber, the vibration damping effect with respect to the vibration input in the generally axis-perpendicular direction or the prizing direction can be obtained with a compact and simple structure.

A seventh mode of the present invention provides the strut mount according to any one of the first through sixth modes, wherein the strut mount is configured to be mounted between the shock absorber and the vehicle body of the automobile that includes an engine having three cylinders or less.

According to the seventh mode, in automobiles equipped with an engine having three cylinders or less, in which the frequency of vibration transmitted during lockup from the drive train to the vehicle body is likely to be close to the frequency of rigid body resonance or the like of the suspension system, deterioration in the vibration state of the vehicle body during lockup can be avoided.

An eighth mode of the present invention provides a suspension mechanism comprising: a shock absorber and a suspension arm that are configured to connect a vehicle body and a wheel assembly; a strut mount according to claim 1, the strut mount being configured to be interposed between the vehicle body and the shock absorber; and a suspension bushing configured to be interposed between the vehicle body and the suspension arm, wherein the suspension bushing includes a fluid-filled zone whose interior is filled with a non-compressible fluid, and an orifice passage through which the fluid filled in the fluid-filled zone is induced to flow, and a tuning frequency of the orifice passage is set to a frequency of a vibration transmitted during lockup of an automobile from a drive train of the automobile to the vehicle body via the suspension arm.

With the suspension mechanism constructed according to the eighth mode, the vibration due to torque fluctuations during lockup can be prevented from being transmitted not only by the strut mount from the shock absorber to the vehicle body, but also by the suspension bushing from the suspension arm to the vehicle body. This makes it possible to more advantageously avoid deterioration in the vibration state of the vehicle body during lockup, thereby achieving more enhanced vibration damping performance and quiet performance. Moreover, both the strut mount and the suspension bushing are of fluid-filled type and exhibit excellent vibration damping effect based on the flow action of the fluid. Thus, the vibration during lockup can be more effectively reduced.

According to the present invention, the vibration transmitted during lockup from the drive train to the vehicle body via the shock absorber of the suspension will be decreased based on the flow action such as resonance action of the fluid flowing through the orifice passage. Thus, even if the number of cylinders of the engine is decreased or the lockup engine speed is reduced such that the frequency of vibration due to torque fluctuations during lockup becomes a low frequency for which rigid body resonance or the like of the suspension system can be a problem, for example, it is possible to prevent the vibration state of the vehicle body from being deteriorated during lockup. Furthermore, with a simple structure utilizing the strut mount conventionally interposed between the shock absorber and the vehicle body, enhanced vibration damping performance during lockup can be realized.

BRIEF DESCRIPTION OF THE DRAWINGS

The foregoing and/or other objects, features and advantages of the invention will become more apparent from the following description of embodiments with reference to the accompanying drawings in which like reference numerals designate like elements and wherein: The patent or application file contains at least one drawing executed in color. Copies of this patent of patent application publication with color drawing(s) will be provided by the Office upon request and payment of the necessary fee.

DETAILED DESCRIPTION OF EMBODIMENTS

Embodiments of the present invention will be described below in reference to the drawings.

Figure 1:
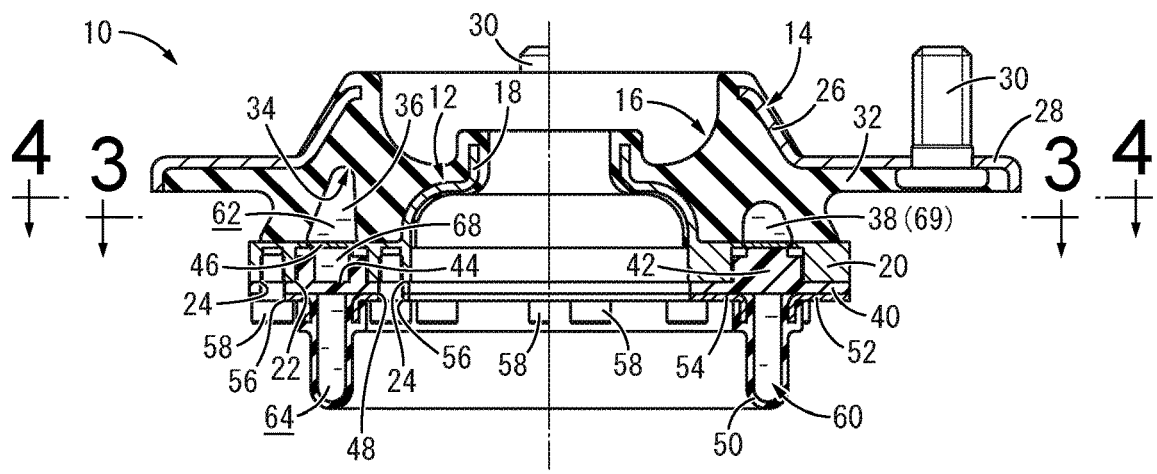
FIG. 1 is a vertical cross sectional view showing a strut mount according to a first embodiment of the present invention, which is equivalent to a cross section taken along line 1-1 of FIG. 2.
Figure 2:
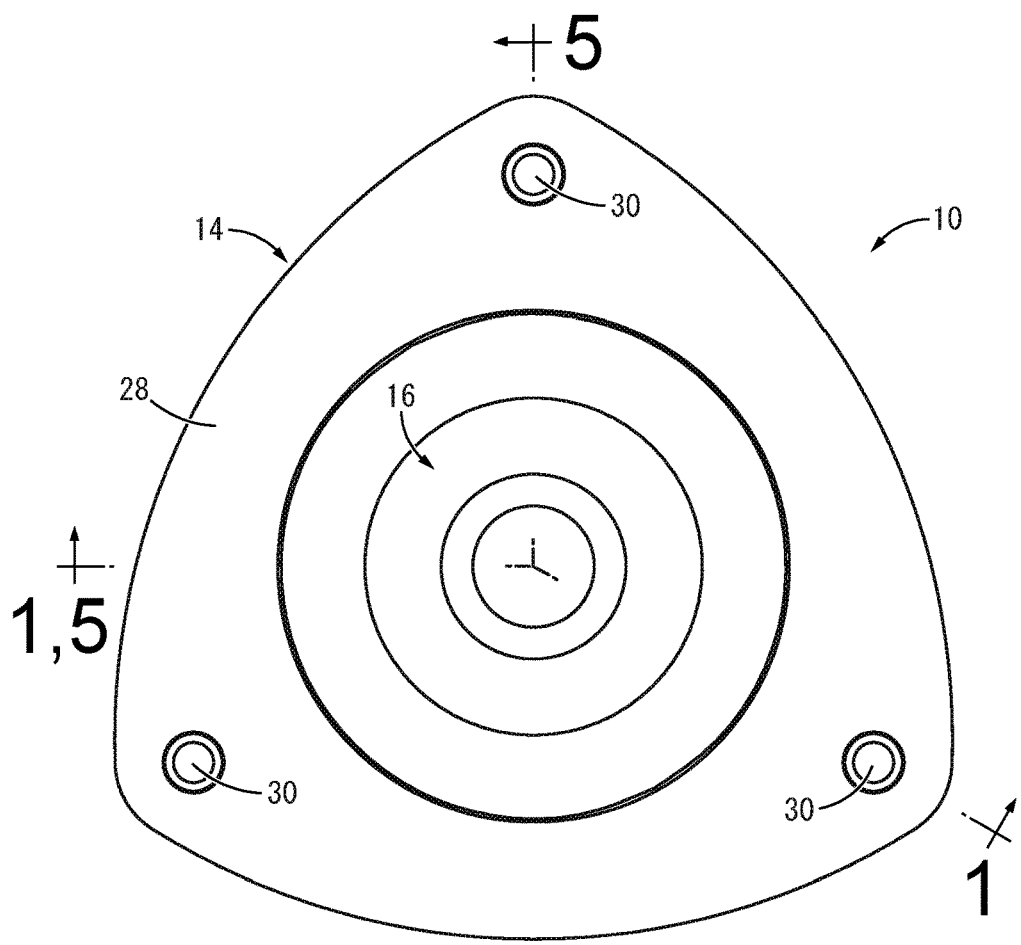
FIG. 2 is a top plane view of the strut mount shown in FIG. 1.

FIGS. 1 and 2 show a strut mount 10 according to a first embodiment of the present invention. The strut mount 10 has a structure in which a first mounting member 12 and a second mounting member 14 are elastically connected by a main rubber elastic body 16. In the description hereinbelow, as a general rule, the up-down direction refers to the up-down direction in FIG. 1, which coincides with the mount axial direction. Besides, the front-rear direction refers to the left-right direction in FIG. 2, which coincides with the vehicle front-rear direction when mounted onto the vehicle. Meanwhile, the left-right direction refers to the up-down direction in FIG. 2, which coincides with the vehicle left-right direction when mounted onto the vehicle.

Described more specifically, the first mounting member 12 is a high rigidity component made of metal, synthetic resin or the like, and includes an inner tube member 18 having a small-diameter, approximately round tubular shape overall. The inner tube member 18 of the present embodiment has a roughly stepped round tubular shape whose upper part is made smaller in diameter than the lower part thereof. Moreover, at the lower end portion of the first mounting member 12, integrally formed is an upper partition member 20 of flange shape extending radially outward in the axis-perpendicular direction. The upper partition member 20 has a roughly annular disk shape overall, and includes an annular mating slot 22 that opens onto the lower face and extends continuously about the entire circumference at the roughly center portion in the width direction, and screw holes 24 that open onto the lower face at several locations in the circumferential direction on the radially inside and outside of the mating slot 22.

The second mounting member 14 is a high rigidity component the same as the first mounting member 12, and includes an outer tube member 26 of large-diameter, tapered round tubular shape that is gradually constricted in diameter toward the top, and a mounting part 28 of flange shape integrally formed with its lower end portion so as to extend radially outward in the roughly axis-perpendicular direction. As shown in FIG. 2, the mounting part 28 has a roughly triangular plate shape overall viewed in the axial direction. Each side of the mounting part 28 curves so as to be convex radially outward, while its three corners are perforated by respective mounting bolts 30 whose axes each project upward.

Then, as shown in FIG. 1, the first mounting member 12 and the second mounting member 14 are disposed so as to be remote from each other on the roughly same center axis, and the main rubber elastic body 16 elastically connects the first mounting member 12 and the second mounting member 14 to each other. The main rubber elastic body 16 has an approximately round tubular shape overall with its inner peripheral portion bonded by vulcanization to the inner tube member 18 of the first mounting member 12, and its lower face is overlapped and bonded by vulcanization to the upper face of the upper partition member 20 of the first mounting member 12, while the upper part of its outer peripheral portion is bonded by vulcanization to the outer tube member 26 of the second mounting member 14. The main rubber elastic body 16 of the present embodiment takes the form of an integrally vulcanization molded component including the first mounting member 12 and the second mounting member 14. Also, a covering rubber 32 integrally formed with the main rubber elastic body 16 is overlapped and bonded by vulcanization to the lower face of the mounting part 28 of the second mounting member 14, so that the head parts of the mounting bolts 30 are bonded to the covering rubber 32 in an embedded state.

Figure 3:
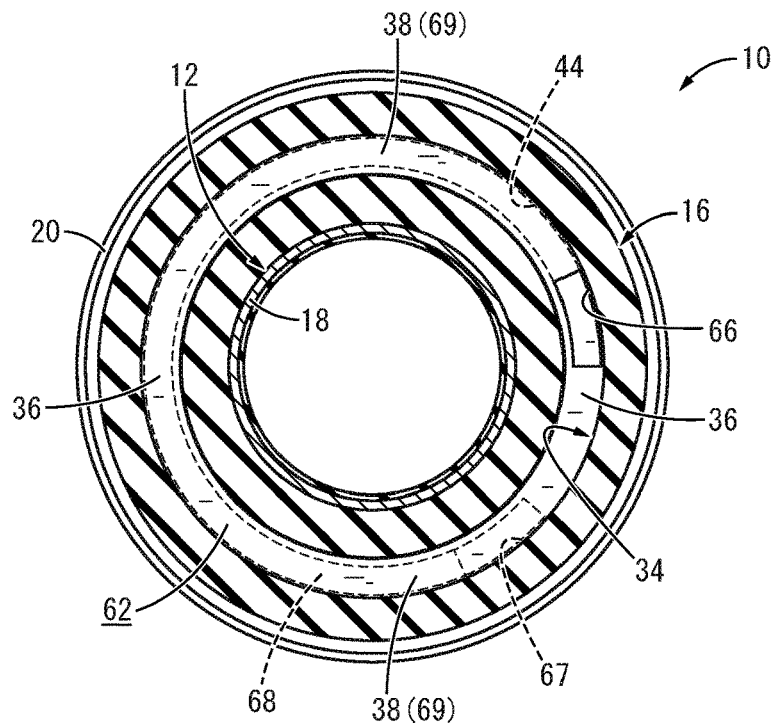
FIG. 3 is a cross sectional view taken along line 3-3 of FIG. 1.
Figure 4:
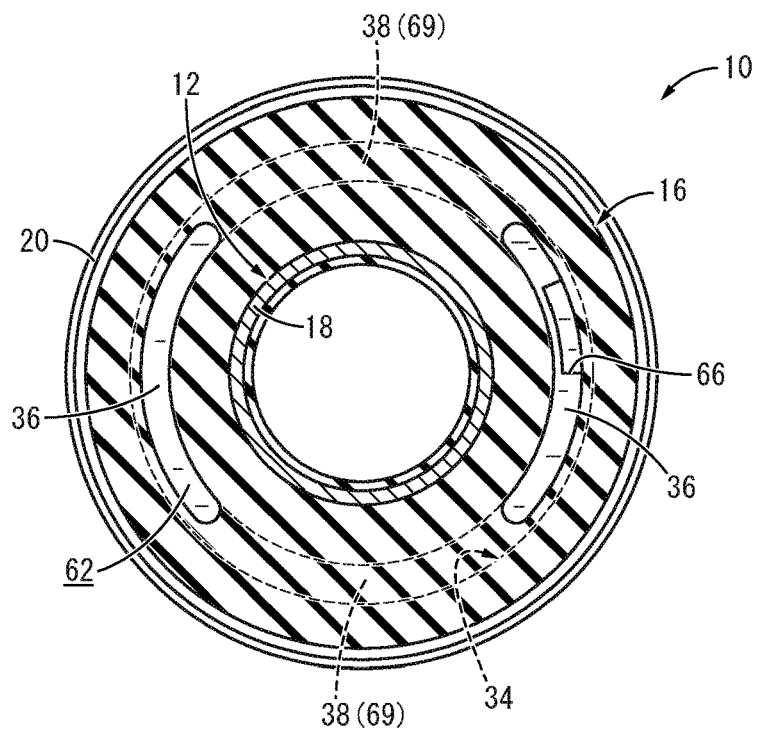
FIG. 4 is a cross sectional view taken along line 4-4 of FIG. 1.

Furthermore, the main rubber elastic body 16 includes a circular recess 34. As shown in FIGS. 1 and 3, the circular recess 34 is a recess of groove form that opens onto the lower face of the main rubber elastic body 16 and extends in the circumferential direction, and is formed continuously about the entire circumference as shown in FIG. 3. Besides, with the circular recess 34, as shown in FIGS. 1 and 4, the portions that are positioned on the opposite sides in the front-rear direction respectively constitute extended areas 36 whose up-down depth is large, while as shown in FIG. 1, the portions that are positioned on the opposite sides in the left-right direction respectively constitute constricted areas 38 whose up-down depth is small. Accordingly, the front/rear pair of extended areas 36, 36 are connected in the circumferential direction via the left/right pair of constricted areas 38, 38.

Besides, a lower partition member 40 is attached to the upper partition member 20 of the first mounting member 12. The lower partition member 40 is a rigid component made of metal or synthetic resin, and has a roughly annular disk shape overall. Moreover, the lower partition member 40 includes an annular mating protrusion 42 that corresponds to the mating slot 22 of the upper partition member 20 and projects upward at the roughly center portion in the width direction. The mating protrusion 42 includes a circumferential groove 44 that opens onto the upper face and extends for a prescribed length just short of once around the circumference in the circumferential direction, and the part opening upward is covered by a lid member 46 as a separate element from the lower partition member 40. In addition, on the radially inside and outside of the mating protrusion 42 of the lower partition member 40, there are formed a plurality of first screw insertion holes 48 that respectively correspond to the screw holes 24 of the upper partition member 20.

Also, a flexible film 50 is disposed below the lower partition member 40. The flexible film 50 is a thin-walled rubber film for which deformation in the thickness direction is readily permitted, and has an annular shape that is continuous about the entire circumference with a generally U-letter cross sectional shape that is convex downward. Furthermore, to the end part of the flexible film 50 positioned on the upper end thereof, an outer circumference fixing member 52 and an inner circumference fixing member 54 are bonded by vulcanization. The outer circumference fixing member 52 is a rigid component having a large-diameter, roughly annular disk shape, and is perforated in the up-down direction by a plurality of second screw insertion holes 56 at the locations corresponding to the first screw insertion holes 48. Besides, the inner peripheral end of the outer circumference fixing member 52 is bonded by vulcanization to the outer peripheral end of the flexible film 50 continuously about the entire circumference. Meanwhile, the inner circumference fixing member 54 is a rigid component having a roughly annular disk shape whose diameter is smaller than that of the outer circumference fixing member 52, and is perforated in the up-down direction by a plurality of second screw insertion holes 56 at the locations corresponding to the first screw insertion holes 48. Besides, the outer peripheral end of the inner circumference fixing member 54 is bonded by vulcanization to the inner peripheral end of the flexible film 50 continuously about the entire circumference. Since the inner peripheral end of the outer circumference fixing member 52 and the outer peripheral end of the inner circumference fixing member 54 both project downward, bonding area to the flexible film 50 is largely obtained.

Then, the lower partition member 40 is overlapped with the upper partition member 20 of the first mounting member 12 from below and the mating protrusion 42 of the lower partition member 40 is inserted in the mating slot 22 of the upper partition member 20. Meanwhile, the outer circumference fixing member 52 and the inner circumference fixing member 54 bonded to the flexible film 50 is overlapped with the lower face of the lower partition member 40. Fixing screws 58 inserted into the first screw insertion holes 48 and the second screw insertion holes 56 are threaded onto the screw holes 24, so that the upper partition member 20, the lower partition member 40, and the fixing members 52, 54 are fixed to one another. While not shown explicitly in the drawings, the space between the overlapped upper partition member 20 and lower partition member 40 is fluid-tightly sealed by an O-ring or the like made of rubber that is arranged on the outer periphery and the inner periphery of the mating protrusion 42, for example. Also, for example, by a seal projection that projects upward from the upper end face of the flexible film 50 being pressed against the lower face of the lower partition member 40, the space formed between the lower partition member 40 and the flexible film 50 (an auxiliary liquid chamber 64 described later) is fluid-tightly isolated from the outside.

In this way, by the upper partition member 20, the lower partition member 40, and the flexible film 50 being fixed to one another, there is formed a fluid-filled zone 60 filled with a non-compressible fluid between the main rubber elastic body 16 and the flexible film 50. The non-compressible fluid sealed in the fluid-filled zone 60 is not especially limited. For example, preferably employed are water, ethylene glycol, alkylene glycol, polyalkylene glycol, silicone oil, or liquid mixture of these or the like. Besides, it is desirable that the fluid sealed in the fluid-filled zone 60 be a low-viscosity fluid in order to advantageously obtain vibration damping effect by virtue of an orifice passage 68 or a constricted passage 69 to be described later, and a low-viscosity fluid having viscosity of 0.1 Pa·s or lower is preferably adopted.

Moreover, the fluid-filled zone 60 is bifurcated into upper and lower parts in the axial direction by the upper partition member 20 and the lower partition member 40. Accordingly, above the upper partition member 20, by the lower opening of the circular recess 34 being covered by the lid member 46, there is formed a primary liquid chamber 62 whose wall part is partially defined by the main rubber elastic body 16 and which gives rise to internal pressure fluctuations during input of vibration. On the other hand, below the lower partition member 40, by the upper opening of the flexible film 50 being covered by the lower partition member 40, there is formed an auxiliary liquid chamber 64 whose wall part is partially defined by the flexible film 50 and which readily permits changes in volume due to deformation of the flexible film 50.

Furthermore, the upper opening of the circumferential groove 44 formed in the mating protrusion 42 of the lower partition member 40 is covered by the lid member 46. One lengthwise end of the circumferential groove 44 communicates with the primary liquid chamber 62 via an upper communication hole 66 that perforates the lid member 46, while the other lengthwise end of the circumferential groove 44 communicates with the auxiliary liquid chamber 64 via a lower communication hole 67 (see FIG. 3) that perforates the bottom wall of the circumferential groove 44 of the lower partition member 40. With this arrangement, an orifice passage 68 that interconnects the primary liquid chamber 62 and the auxiliary liquid chamber 64 is provided.

With the orifice passage 68, by adjusting the ratio (A/L) of the passage cross sectional area (A) to the passage length (L), the tuning frequency, which is the resonance frequency of the flowing fluid, is set within a frequency range of vibration due to the torque fluctuations that is transmitted during lockup of an automobile from the drive train to the vehicle via a shock absorber 72 to be described later. When vibration in the tuning frequency range of the orifice passage 68 is input across the first mounting member 12 and the second mounting member 14, relative pressure fluctuations arise between the primary liquid chamber 62 and the auxiliary liquid chamber 64. Then, fluid flow will take place between the primary liquid chamber 62 and the auxiliary liquid chamber 64 through the orifice passage 68, such that vibration damping effect is configured to be obtained based on the flow action of the fluid such as resonance action of the fluid. In preferred practice, the orifice passage 68 is tuned to a low frequency from 1 Hz to 50 Hz including the resonance frequency of a suspension system described later, the drive train, or the like. In the present embodiment, on the assumption that the lockup engine speed, at which input vibration is required to be improved for the automobile that includes an engine having three cylinders, is from 1000 rpm to 1500 rpm, the orifice passage 68 is tuned to a frequency from 25 Hz to 37.5 Hz.

Also, by the lower openings of the constricted areas 38, 38 of the primary liquid chamber 62 being covered by the lid member 46, a constricted passage 69 that interconnects the extended areas 36, 36 of the primary liquid chamber 62 is constituted by a portion of the primary liquid chamber 62 (the constricted areas 38, 38). With the constricted passage 69 as well, the same as the orifice passage 68, the resonance frequency of the flowing fluid is tuned by adjusting the ratio (A'/L') of the passage cross sectional area (A') to the passage length (L'). Accordingly, the tuning frequency of the constricted passage 69 is set to a higher frequency than the tuning frequency of the orifice passage 68. When vibration in the tuning frequency range of the constricted passage 69 is input across the first mounting member 12 and the second mounting member 14, the orifice passage 68 substantially clogs due to antiresonance, while fluid flow actively takes place between the extended areas 36, 36 of the primary liquid chamber 62 through the constricted passage 69 in a resonant state, thereby exhibiting vibration damping effect based on the flow action of the fluid. The tuning frequency of the constricted passage 69 is preferably set within the range of 20 Hz to 100 Hz, and in the present embodiment, set to a frequency on the order of 45 Hz to 100 Hz so as to match the frequency of vibration input from the road surface such as harshness.

Figure 5:
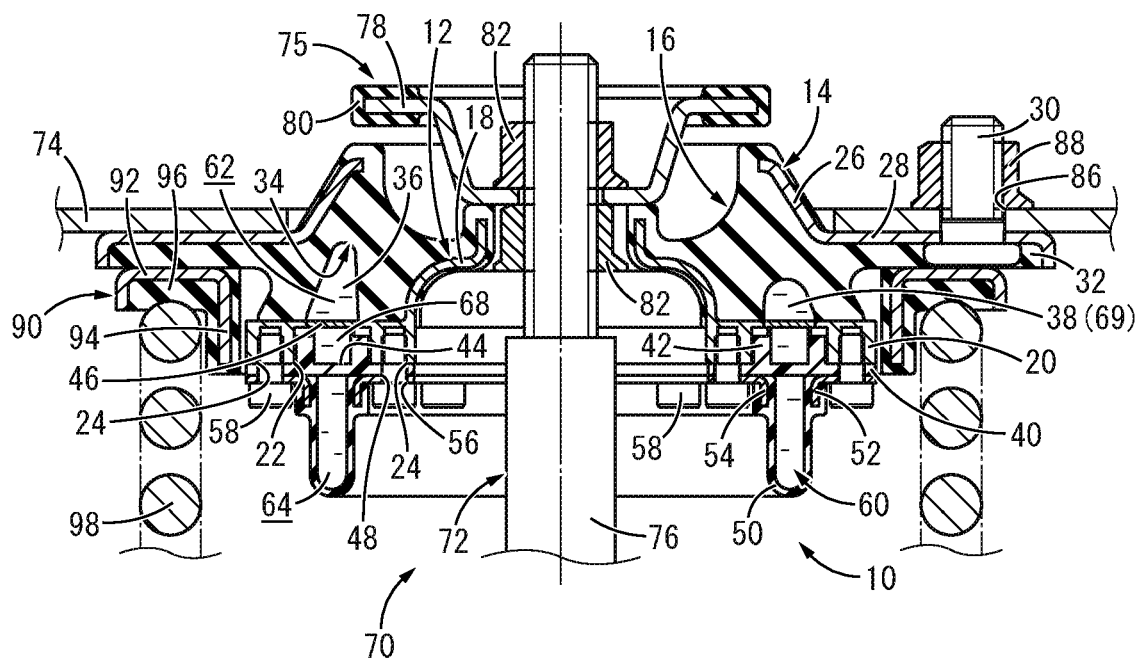
FIG. 5 is a cross sectional view of the strut mount shown in FIG. 1 in a mounted state onto a vehicle, which is equivalent to a cross section taken along line 5-5 of FIG. 2.
Figure 6:
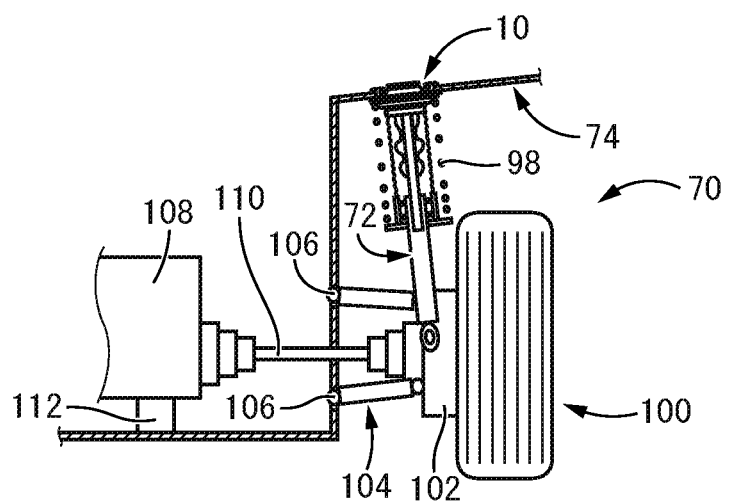
FIG. 6 is a view showing a suspension mechanism including the strut mount of FIG. 1.

The strut mount 10 of construction according to the present embodiment described above is provided to a suspension mechanism 70 of an automobile that includes an engine having three cylinders, as shown in FIGS. 5 and 6, and is interposed between a shock absorber 72 and a vehicle body 74. Specifically, a stopper member 75 is overlapped with the inner tube member 18 of the first mounting member 12 from above, and the first mounting member 12 and the stopper member 75 is fixed to a piston rod 76 of the shock absorber 72. The stopper member 75 is a high rigidity component made of metal or synthetic resin, and has a generally cup shape opening upward. To the upper end portion of the stopper member 75, a flange-shaped stopper piece 78 is integrally formed so as to extend radially outward, and the outer peripheral end of the stopper piece 78 is covered by a cushioning rubber 80. The inner peripheral end of the stopper member 75 is pinched in the up-down direction between upper and lower positioning nuts 82, 82, and the upper and lower positioning nuts 82, 82 are threaded onto the piston rod 76. By so doing, the stopper member 75 is positioned in the up-down direction with respect to the piston rod 76.

On the other hand, the second mounting member 14 is fixed to the vehicle body 74 by the mounting bolts 30. Specifically, the vehicle body 74 is overlapped with the mounting part 28 of the second mounting member 14 from above, while the mounting bolts 30 fixed to the second mounting member 14 is inserted into bolt holes 86 formed in the vehicle body 74. By mounting nuts 88 being threaded onto the axes of the mounting bolts 30 projecting above the vehicle body 74, the second mounting member 14 is configured to be attached to the vehicle body 74. In this way, the first mounting member 12 is attached to the shock absorber 72, and the second mounting member 14 is attached to the vehicle body 74. By so doing, the upper end portion of the shock absorber 72 is attached to the vehicle body 74 via the strut mount 10. The vehicle body 74 is perforated in the up-down direction by a circular hole in the portion to which the second mounting member 14 is mounted, and the rim of the opening of the circular hole is overlapped with the mounting part 28 of the second mounting member 14.

Moreover, a spring support member 90 is overlapped with the mounting part 28 of the second mounting member 14 from below. The spring support member 90 includes a support part 92 having a generally annular disk shape and overlapped with the mounting part 28 of the second mounting member 14 from below, and an insertion part 94 extending downward from the inner peripheral end of the support part 92 and having a generally round tubular shape. The lower face of the support part 92 and the roughly entire face of the insertion part 94 are covered by a support rubber 96.

With the lower face of the support part 92 covered by the support rubber 96, overlapped is an upper end portion of a coil spring 98 that is placed externally about the shock absorber 72, so that the upper end portion of the coil spring 98 is supported by the second mounting member 14 via the spring support member 90. The spring support member 90 of the present embodiment is positioned with respect to the second mounting member 14 by being pressed by the coil spring 98 against the mounting part 28 of the second mounting member 14. Besides, the annular flexible film 50 is arranged radially between the piston rod 76 of the shock absorber 72 and the coil spring 98. With this arrangement, it is possible to set the up-down dimension of the flexible film 50 with a large degree of freedom, and a sufficient volume of the auxiliary liquid chamber 64 is obtained. In addition, an ample space for permitting deformation of the flexible film 50 is ensured, thereby sufficiently permitting changes in volume. The lower end portion of the coil spring 98 is supported by a cylinder of the shock absorber 72, for example, and the coil spring 98 is configured to undergo extension/contraction in accordance with extension/contraction of the shock absorber 72.

As described above, the first mounting member 12 of the strut mount 10 is attached to the shock absorber 72 while the second mounting member 14 is attached to the vehicle body 74, so that the shock absorber 72 and the vehicle body 74 are linked in a vibration damped manner via the strut mount 10.

The lower end portion of the shock absorber 72 is attached to a wheel assembly 100, as shown in FIG. 6. The wheel assembly 100 has a structure in which a tire is mounted onto a wheel, and the lower end portion of the shock absorber 72 is attached to a steering knuckle 102 provided to the wheel. Furthermore, a suspension arm 104 is attached to the steering knuckle 102 of the wheel assembly 100, and the suspension arm 104 is attached to the vehicle body 74 via a suspension bushing 106 at the opposite end from the steering knuckle 102.

The suspension bushing 106 is, for example, a fluid-filled tubular vibration-damping device having a structure such as disclosed in Japanese Unexamined Patent Publication No. JP-A-2016-075347, and includes a fluid-filled zone whose interior is filled with a non-compressible fluid, and an orifice passage through which the non-compressible fluid flows. Besides, with the orifice passage of the suspension bushing 106, the tuning frequency is set so as to match the vibration due to torque fluctuations during lockup. In the present embodiment, the tuning frequency of the orifice passage of the suspension bushing 106 is roughly the same as the tuning frequency of the orifice passage 68 of the strut mount 10.

Furthermore, an axle attached to the steering knuckle 102 is configured to be rotated by a drive shaft 110 taken out of a differential of a power unit 108, so that the wheel assembly 100 is configured to be rotated by the drive shaft 110. The power unit 108 is elastically connected to the vehicle body 74 by an engine mount 112. The specific structure of the engine mount 112 is not limited in particular, and any of various structures known in the art can be adopted such as a solid type, a fluid-filled type, an active type that decreases vibrations in an offset fashion owing to oscillation force of an electromagnetic actuator or the like, and a switching type whose vibration damping characteristics are switchable owing to a pneumatic actuator or the like.

Vibrations due to torque fluctuations arising during lockup of the drive train will be transmitted from the drive shaft 110 to the drive train to the steering knuckle 102 of the suspension mechanism 70, and will be transmitted to the vehicle body 74 via the shock absorber 72 and the suspension arm 104.

Here, the strut mount 10 is disposed between the shock absorber 72 and the vehicle body 74, and vibrations due to torque fluctuations during lockup that are to be transmitted to the vehicle body 74 via the shock absorber 72 is input across the first mounting member 12 and the second mounting member 14 in the axial direction (up-down direction). Then, the vibrations due to torque fluctuations during lockup that are to be transmitted from the drive shaft 110 to the vehicle body 74 via the shock absorber 72 will be decreased owing to the vibration damping performance of the strut mount 10. In particular, the strut mount 10 is fluid-filled type, and the orifice passage 68 is tuned to a frequency of vibration due to torque fluctuations during lockup. Thus, excellent vibration damping effect based on the flow action of the fluid will be exhibited with respect to the vibration due to torque fluctuations during lockup. Therefore, the vibration due to torque fluctuations during lockup is prevented from being transmitted from the suspension side to the vehicle body 74 via the shock absorber 72, thereby improving vibration damping performance and quiet performance.

Moreover, the strut mount 10 of the present embodiment has a structure in which the primary liquid chamber 62, which induces internal pressure fluctuations during input of vibration, and the auxiliary liquid chamber 64, whose internal pressure is kept roughly constant owing to changes in volume, are interconnected by the orifice passage 68. Therefore, during input of vibration, fluid flow through the orifice passage 68 will efficiently take place, thereby advantageously exhibiting vibration damping effect owing to the flow action of the fluid. In particular, since the vibration due to torque fluctuations during lockup is input to the strut mount 10 in the axial direction, internal pressure fluctuations in the primary liquid chamber 62 will be efficiently induced. This will produce relative pressure differential between the primary liquid chamber 62 and the auxiliary liquid chamber 64, so that desired vibration damping effect can be advantageously obtained.

Meanwhile, the suspension bushing 106 is disposed between the suspension arm 104 and the vehicle body 74. Accordingly, vibrations due to torque fluctuations during lockup that are to be transmitted from the drive shaft 110 to the vehicle body 74 via the suspension arm 104 will be decreased owing to the suspension bushing 106. In particular, since the suspension bushing 106 is fluid-filled type and the orifice passage of the suspension bushing 106 is tuned to a frequency of vibration due to torque fluctuations during lockup, excellent vibration damping effect will be exhibited with respect to the vibration due to torque fluctuations during lockup. Therefore, the vibration due to torque fluctuations during lockup is prevented from being transmitted from the suspension side to the vehicle body 74 via the suspension arm 104, thereby improving vibration damping performance and quiet performance.

Also, the orifice passage 68 of the strut mount 10 and the orifice passage of the suspension bushing 106 are both tuned to a low frequency on the order of 1 to 50 Hz, which is the frequency range of rigid body resonance of the suspension system (rigid body resonance of the shock absorber 72 or rigid body resonance of the suspension arm 104), for example. This makes it possible to obtain vibration damping effect owing to the strut mount 10 and the suspension bushing 106 in the low frequency range for which amplification of vibration tends to be a problem due to rigid body resonance of the suspension system or the like.

Furthermore, even if the strut mount 10 and the suspension bushing 106 are implemented in an automobile that includes an engine having three cylinders or less, for which the frequency of vibration due to torque fluctuations during lockup is lower than that for an engine having four cylinders or more that has been generally adopted, it is possible to effectively decrease vibration due to torque fluctuations during lockup, since the orifice passages thereof are tuned to a low frequency. In particular, even if the lockup engine speed is reduced in addition to decreasing the number of cylinders such that the frequency of vibration due to torque fluctuations during lockup becomes lower to the frequency range for which vibration amplification due to rigid body resonance or the like of the suspension system or the drive train can be a problem, for example, it is possible to avoid deterioration in the vibration state owing to the vibration damping effect of the strut mount 10 and the suspension bushing 106.

With respect to the vibration input due to torque fluctuations during lockup, the strut mount 10 and the suspension bushing 106 selectively exhibit either one of the vibration damping effect owing to high attenuating action based on the flow action of the fluid and the vibration damping effect owing to vibration insulating action (low dynamic spring behavior) based on the flow action of the fluid, depending on the tuning of the orifice passage. Whether the high attenuating action or the vibration insulating action is effective can be suitably selected in consideration of the resonance frequency of the vibration amplification system such as the suspension system and the drive train, the resonance frequency of the vehicle body 74, and the like. As one example, in the case in which the differential between the resonance frequency of the suspension system, the drive train or the like and the resonance frequency of the vehicle body 74 is small, it is conceivable to tune such that the high attenuating action decreases the vibration amplification due to rigid body resonance of the suspension system and the drive train.

Figure 7:
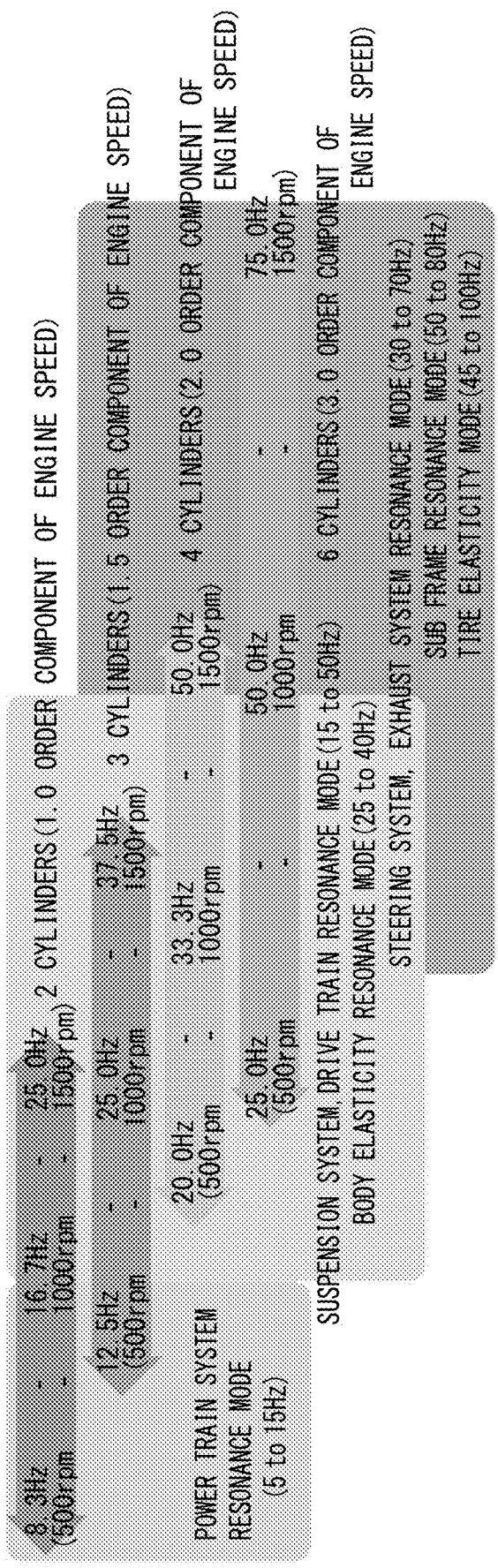
FIG. 7 is a view showing a relationship among the number of cylinders of an engine, the lockup engine speed, and a frequency of vibration due to torque fluctuations.

With a four-cycle engine, the frequency of vibration due to torque fluctuations during lockup can be easily calculated by using the number of cylinders of the engine and the engine speed during lockup, and specifically, can be calculated by multiplying the engine speed per second by one-half of the number of cylinders of the engine. As shown in FIG. 7, with a two-cylinder engine, the frequency of vibration due to torque fluctuations during lockup is 8.3 Hz for the engine speed 500 rpm during lockup, 16.7 Hz for 1000 rpm, and 25.0 Hz for 1500 rpm. With a three-cylinder engine, the aforementioned frequency is 12.5 Hz for the engine speed 500 rpm during lockup, 25.0 Hz for 1000 rpm, and 37.5 Hz for 1500 rpm. With a four-cylinder engine, the aforementioned frequency is 20.0 Hz for 500 rpm, 33.3 Hz for 1000 rpm, and 50.0 Hz for 1500 rpm. With a six-cylinder engine, the aforementioned frequency is 25.0 Hz for 500 rpm, 50.0 Hz for 1000 rpm, and 75.0 Hz for 1500 rpm.

In this way, if the number of cylinders is equal, the lower the engine speed during lockup is, the lower the frequency of vibration due to torque fluctuations becomes. Meanwhile, if the engine speed during lockup is equal, the smaller the number of cylinders is, the lower the frequency of vibration due to torque fluctuations becomes. In the range of 1000 rpm to 1500 rpm which can be adopted as the engine speed during lockup in order to realize enhanced fuel economy under the present circumstances, as shown in FIG. 7, with each of the two-cylinder, three-cylinder, and four-cylinder engines, the frequency of vibration due to torque fluctuations during lockup and the frequency of resonance mode of the suspension system and drive train are close to each other, so that amplification of vibration due to rigid body resonance of the suspension system or the drive train is likely to occur. Therefore, with respect to an automobile including a two-to four-cylinder engine and whose lockup engine speed is 1000 rpm to 1500 rpm, by applying the strut mount 10 and the suspension bushing 106 according to the present embodiment, the vibrations due to torque fluctuations during lockup can be effectively decreased. In particular, through application in an automobile that includes an engine having three cylinders or less, it is also possible to set the engine speed during lockup even lower, thereby enhancing fuel economy performance.

Figure 8:
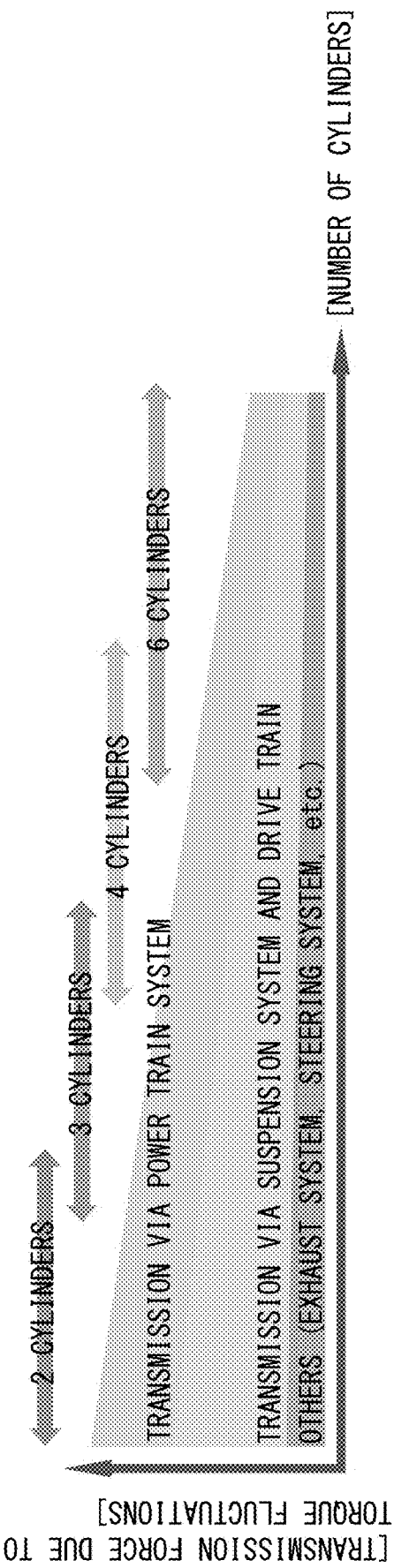
FIG. 8 is a view showing a relationship between the number of cylinders of the engine and a transmitted component of the vibration due to torque fluctuations, which is classified by transmission path.

Moreover, as shown in FIG. 8, it was confirmed through tests and simulations that, with respect to the vibrations due to torque fluctuations during lockup, as the number of cylinders of the engine decreases, the ratio of vibration transmission via the path from the drive train to the suspension system becomes higher than that of transmission via the power train system as the path or that of transmission via other path. Therefore, with respect to the suspension mechanism 70 of the automobile that includes an engine having three cylinders or less, by applying the strut mount 10 and the suspension bushing 106 according to the present embodiment, the vibrations due to torque fluctuations during lockup can be more effectively decreased.

Figure 9:
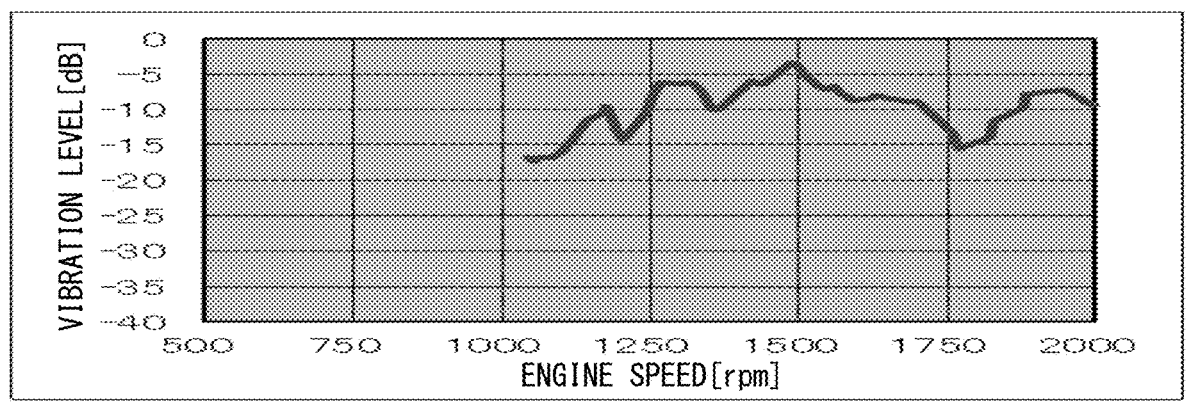
FIG. 9 is a graph of actual measurements in which vibrations on a suspension side are measured during locked-up acceleration of an automobile equipped with a three-cylinder engine.
Figure 10:
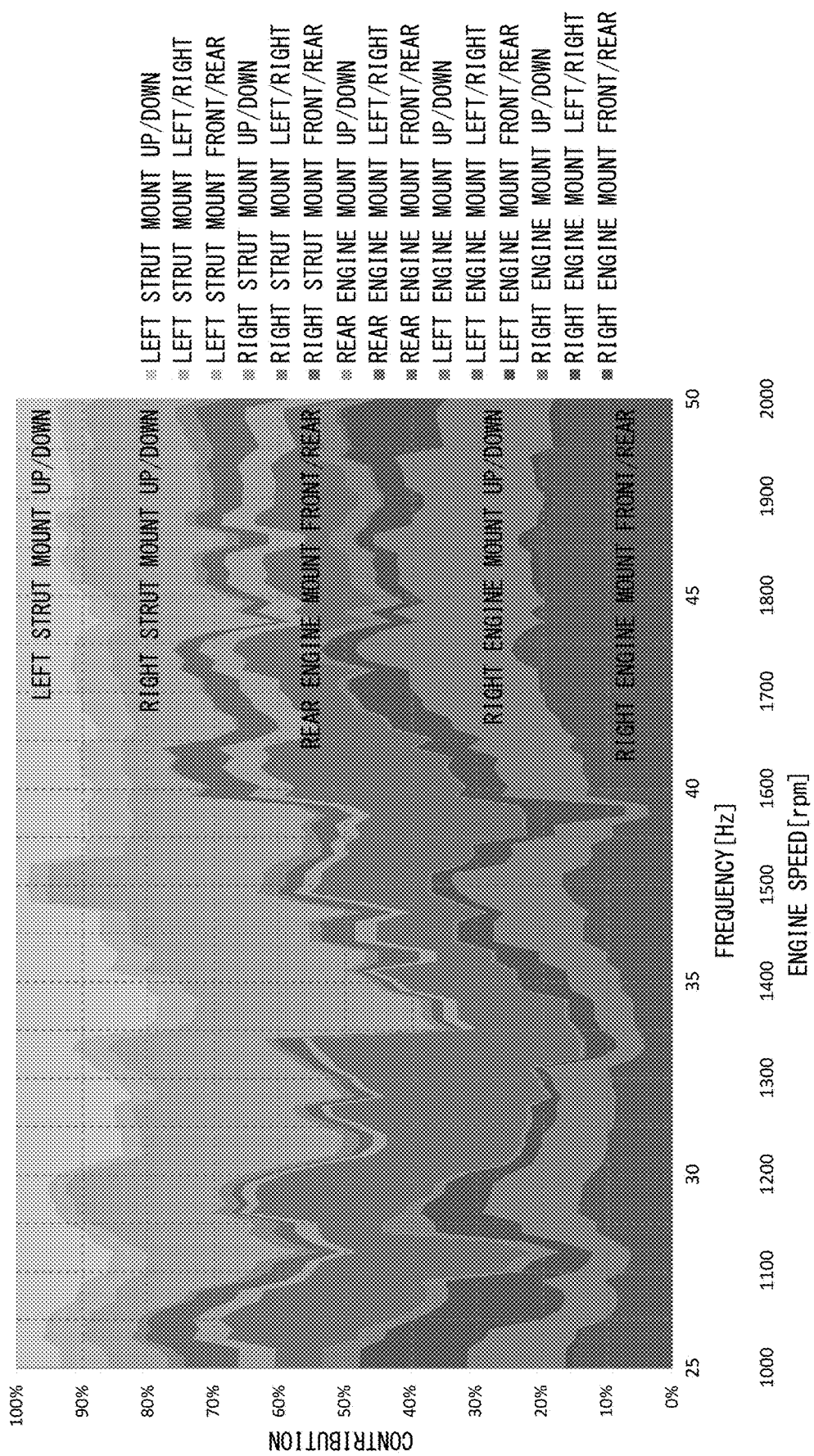
FIG. 10 is a graph for which in measurement results of floor vibration during locked-up acceleration of the automobile equipped with a three-cylinder engine, contribution of each transmission path is analyzed.

FIGS. 9 and 10 show actual measurement data about an automobile including three-cylinder engine. FIG. 9 shows the results of measuring the up-down vibrations of the strut mount on the suspension side during locked-up acceleration, and a plurality of peaks of vibration level which was thought to be rigid body resonance of the suspension system or the like were confirmed within the range for which the engine speed during lockup is 1000 rpm to 2000 rpm. Next, FIG. 10 shows the ratio of contribution of vibration transmitted by each path so as to indicate which contribution is large in the floor vibrations (up-down vibrations, left-right vibrations, and front-rear vibrations) in the vehicle body 74 during locked-up acceleration. It was confirmed that the contribution of left and right strut mounts was large in the range of 1000 rpm to 2000 rpm. In particular, in the actual measurements in FIG. 10, in the range for which the engine speed is about 1370 rpm to 1600 rpm, the contribution of left and right strut mounts was as large as about 50% to 70%. Thus, it was confirmed that the vibrations due to torque fluctuations during lockup were input to the vehicle body 74 via the suspension system.

According to the actual measurements of FIGS. 9 and 10, it was found that with an automobile including a three-cylinder engine, by adopting the strut mount 10 according to the present embodiment, it is possible to attain excellent vibration damping performance in the case in which the lockup engine speed is in the range of 1000 rpm to 2000 rpm. In particular, according to FIG. 10, it can be assumed that, by adopting the strut mount 10, excellent vibration damping effect will be exhibited especially in the range of 1370 rpm to 1600 rpm. It should be appreciated that the actual measurements shown in FIGS. 9 and 10 are not common to all automobiles including a three-cylinder engine, but are merely shown by way of example.

Also, with the strut mount 10 of the present embodiment, the primary liquid chamber 62 includes the front/rear pair of extended areas 36, 36 and the left/right pair of constricted areas 38, 38, and the extended areas 36, 36 are interconnected in the circumferential direction by the constricted areas 38, 38 (constricted passages 69, 69) that is made tunnel-like by the lid member 46. With this arrangement, when the wheel assembly 100 overrides depressions or ridges on the road surface or the like, with respect to the vibration input in the strut mount 10 in the generally axis-perpendicular direction (including the direction that inclines with respect to both of the axial direction and the axis-perpendicular direction) or in the prizing direction, relative internal pressure differential is produced within the front/rear pair of extended areas 36, 36, so as to allow a fluid flow through the constricted passages 69, 69 between the extended areas 36, 36. As a result, the strut mount 10 will exhibit vibration damping effect based on the flow action of the fluid, and is able to obtain excellent vibration damping performance with respect to the vibration input from the wheel assembly 100 as well, which is in contact with a road surface.

In particular, the vibration input from the wheel assembly 100 that is in contact with a road surface when overriding depressions or ridges on the road surface or the like has a higher frequency than the vibration due to torque fluctuations during lockup does. Thus, the orifice passage 68 tuned to the frequency of vibration due to torque fluctuations during lockup substantially clogs due to antiresonance. On the other hand, with the constricted passages 69, 69, the resonance frequency of the flowing fluid is tuned to a higher frequency than the tuning frequency of the orifice passage 68, and tuned to the vibration input from the road surface. Thus, desired vibration damping effect can be efficiently attained.

An embodiment of the present invention has been described in detail above, but the present invention is not limited to those specific descriptions. For example, while the preceding embodiment illustrated the strut mount 10 having the structure in which the vehicle body 74 is fixed by bolting to the second mounting member 14, it is also possible to adopt the structure in which, for example, the vehicle body is overlapped with the second mounting member from above without being fixed thereto.

Figure 11:
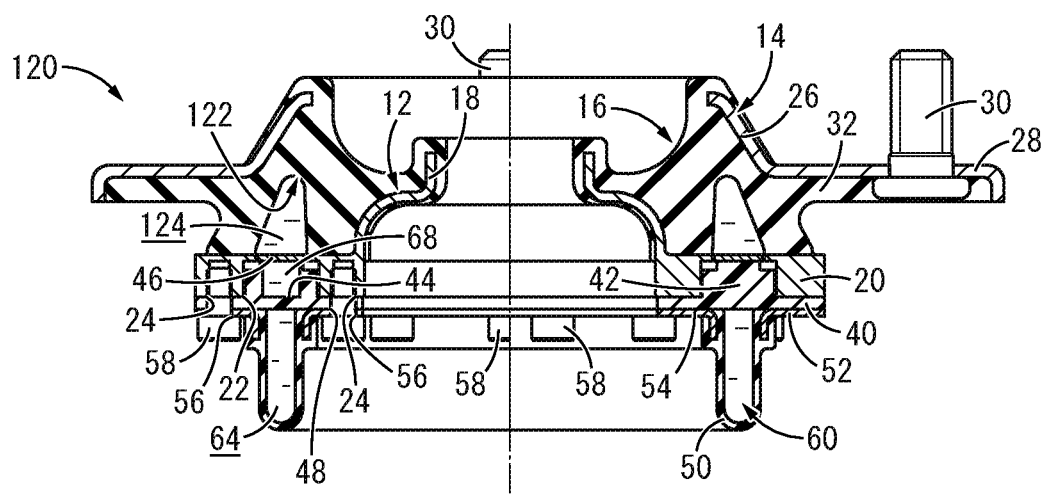
FIG. 11 is a vertical cross sectional view showing a strut mount according to a second embodiment of the present invention.

Besides, in the preceding embodiment, illustrated was the structure in which the primary liquid chamber 62 includes the front/rear pair of extended areas 36, 36 and the left/right pair of constricted areas 38, 38, and a fluid flow will take place through the constricted areas 38, 38 between the extended areas 36, 36 so as to exhibit vibration damping effect based on the flow action of the fluid. However, such extended areas 36, 36 and the constricted areas 38, 38 are not essential. Specifically, with a strut mount 120 shown in FIG. 11, a circular recess 122 formed in the main rubber elastic body 16 has a cross sectional shape that is generally constant about the entire circumference. Accordingly, a primary liquid chamber 124 formed by the lower opening of the circular recess 122 being covered by the lid member 46 has a cross sectional shape that is generally constant about the entire circumference. With such strut mount 120 as well, the same as the preceding embodiment, with respect to the vibrations due to torque fluctuations during lockup, vibration damping effect will be attained based on the resonance action or the like of the fluid flowing through the orifice passage 68 between the primary liquid chamber 124 and the auxiliary liquid chamber 64. Whereas the circular recess 122 in FIG. 11 has a cross sectional shape that is equivalent to that of the extended area 36 in the preceding embodiment, no particular limitation is imposed as to the shapes of the circular recess and hence the primary liquid chamber. Moreover, the primary liquid chamber and the auxiliary liquid chamber need not have an annular shape that is continuous about the entire circumference, but may have a C-letter shape that extends just short of once around the circumference, or the like.

Figure 12:
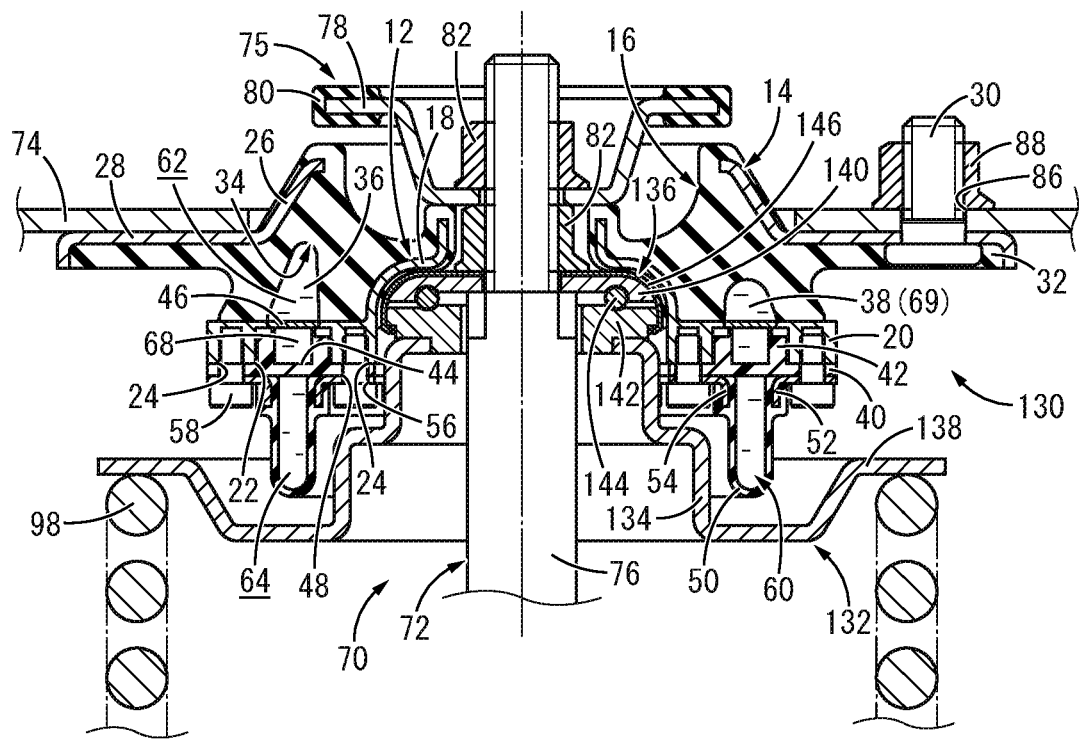
FIG. 12 is a vertical cross sectional view showing a strut mount according to a third embodiment of the present invention.

The preceding embodiment illustrated the strut mount 10 of dual-path type for which the vibration from the drive train is input substantially by the shock absorber 72 only. However, for example, the present invention can preferably be applied to a structure of single-path type like a strut mount 130 as shown in FIG. 12. In a mounted state onto a vehicle, for which the vibration is input by both of the shock absorber 72 and the coil spring 98. In the following description about the strut mount 130 shown in FIG. 12, components and parts that are substantially identical with those of the strut mount 10 in the preceding first embodiment will be assigned like symbols and not described in any detail, the same as the strut mount 120 shown in FIG. 11.

As shown in FIG. 12, with the strut mount 130, the first mounting member 12 is attached to the piston rod 76 of the shock absorber 72 similar to the first embodiment, while a spring support fitting 132 for supporting the upper end portion of the coil spring 98 is attached to the first mounting member 12.

Moreover, the spring support fitting 132 includes a tubular inner peripheral portion 134, and the inner peripheral portion 134 is attached to the first mounting member 12 via an annular bearing 136 inserted into the inner tube member 18. By so doing, when a rotational moment in the circumferential direction acts on an annular-plate shaped outer peripheral portion 138 for supporting the coil spring 98, the spring support fitting 132 is allowed to rotate relative to the first mounting member 12, so as to avoid torsion input in the circumferential direction with respect to the main rubber elastic body 16. This will improve durability of the main rubber elastic body 16.

With the bearing 136, an upper part 140 is fixed to the first mounting member 12, while a lower part 142 is attached rotatably relative to the upper part 140 via a rolling element 144 of ball form, so that the lower part 142 is rotatable with respect to the first mounting member 12 in the circumferential direction. In addition, the upper part 140 and the lower part 142 are relatively positioned in the up-down direction by a thin-walled connecting member 146 that is fitted externally thereon, and are retained so as not to be separated in the up-down direction. The inner peripheral portion 134 of the spring support fitting 132 is fixed to the lower part 142 of the bearing 136.

With the strut mount 130 of structure as shown in FIG. 12, the vibrations in the up-down direction transmitted through the drive train due to torque fluctuations during lockup are input not only via the shock absorber 72 but also via the coil spring 98. Then, in the strut mount 130, the same as in the strut mount 10 of the first embodiment, vibration damping effect will be exhibited based on the flow action of the fluid. Accordingly, the vibration transmitted to the vehicle body 74 via the shock absorber 72 and the coil spring 98 will be decreased, thereby realizing good ride comfort or the like. As will be understood from this, the application range of the strut mount according to the present invention is not limited to application in the structure in which all the vibrations during lockup of the automobile is transmitted from the automotive drive train to the vehicle body via the shock absorber.

Furthermore, the preceding embodiment adopted the suspension bushing 106 of fluid-filled type, and illustrated the structure in which the tuning frequency of the orifice passage of the suspension bushing 106 was set to the frequency of vibration due to torque fluctuations during lockup. However, it would also be acceptable, for example, to tune the orifice passage of the suspension bushing to the frequency of vibration input from the road surface, or to adopt a solid-type bushing such as disclosed in Japanese Unexamined Patent Publication No. JP-A-2014-145410 or the like as the suspension bushing.

What is claimed is:

1. A strut mount comprising:
a first mounting member configured to be attached to a shock absorber;
a second mounting member configured to be attached to a vehicle body;
a main rubber elastic body elastically connecting the first mounting member to the second mounting member;
a fluid-filled zone with an interior filled with a non-compressible fluid such that a vibration damping effect occurs based on a flow action of the fluid, the fluid-filled zone including a primary liquid chamber with a wall part partially defined by the main rubber elastic body and configured to fluctuate in internal pressure in response to an input of vibration to the strut mount, and an auxiliary liquid chamber with a wall part partially defined by a flexible film and configured to change volume in response to deformation of the flexible film; and
an orifice passage through which the fluid in the fluid-filled zone is induced to flow, the primary liquid chamber and the auxiliary liquid chamber being interconnected by the orifice passage, wherein:
a tuning frequency of the orifice passage is set to a frequency of a vibration transmitted during lockup of an automobile from a drive train of the automobile to the vehicle body via the shock absorber,
the fluid-filled zone is bifurcated into the primary liquid chamber and the auxiliary liquid chamber by a partition member, and a circumferential groove formed in the partition member is connected to the primary liquid chamber at a first end and to the auxiliary liquid chamber at a second end to form the orifice passage,
the main rubber elastic body includes a circular recess having an opening covered by the partition member to form the primary liquid chamber, the circular recess including (i) a pair of extended areas positioned on opposite sides of the circular recess in a vehicle front-rear direction, and (ii) a pair of constricted areas positioned on opposite sides of the circular recess in a vehicle left-right direction, the pair of extended areas having a greater depth into the main rubber elastic body than a depth of the pair of constricted areas, and the pair of extended areas being connected with each other in a circumferential direction with respect to the main rubber elastic body by the pair of constricted areas, and
a resonance frequency of the constricted areas is greater than the tuning frequency of the orifice passage.

2. The strut mount according to claim 1, wherein the tuning frequency of the orifice passage is set to be no greater than 50 Hz.

3. The strut mount according to claim 1, wherein the strut mount is configured such that:
the vibration to be transmitted during lockup of the automobile from the drive train of the automobile to the vehicle body via the shock absorber is transferred across the first mounting member and the second mounting member in an axial direction,
a road surface vibration to be transmitted from a wheel assembly in contact with a road surface to the vehicle body via the shock absorber is transferred across the first mounting member and the second mounting member in either one of (i) an axis-perpendicular direction and (ii) a prizing direction, and
a resonance frequency of the fluid under an effect of the transferred road surface vibration is greater than the tuning frequency of the orifice passage.

4. The strut mount according to claim 3, wherein the constricted areas are configured to allow a fluid to flow between the extended areas based on the transferred road surface vibration.

5. The strut mount according to claim 1, wherein the strut mount is configured to be mounted between the shock absorber and the vehicle body of the automobile, the automobile including an engine having three cylinders or less.

6. A suspension mechanism comprising:
a suspension arm;
the strut mount according to claim 1, the shock absorber and the suspension arm being configured to connect the vehicle body to a wheel assembly, the strut mount being configured to be interposed between the vehicle body and the shock absorber; and
a suspension bushing configured to be interposed between the vehicle body and the suspension arm, the suspension bushing including (i) a secondary fluid-filled zone having an interior filled with a secondary non-compressible fluid, and (ii) a secondary orifice passage through which a secondary fluid in the secondary fluid-filled zone is induced to flow,
wherein a tuning frequency of the secondary orifice passage of the suspension bushing is equal to the frequency of the vibration transmitted during lockup of the automobile from the drive train of the automobile to the vehicle body via the suspension arm.

* * * * *